D. H. FRIEND.
BALL BEARING.
APPLICATION FILED AUG. 7, 1916.

1,244,846.

Patented Oct. 30, 1917.

Witness:
Ernest C. Crocker

Inventor,
David H. Friend
By Harry Frease
Attorney.

UNITED STATES PATENT OFFICE.

DAVID H. FRIEND, OF NORTH INDUSTRY, OHIO.

BALL-BEARING.

1,244,846.  Specification of Letters Patent.  Patented Oct. 30, 1917.

Application filed August 7, 1916. Serial No. 113,468.

*To all whom it may concern:*

Be it known that I, DAVID H. FRIEND, a citizen of the United States, residing at North Industry, in the county of Stark and State of Ohio, have invented certain new and useful Improvements in Ball-Bearings, of which the following is a specification.

The invention relates to bearings for small size shafts, and the object of the improvement is to provide a bearing in which a shaft of maximum diameter can be used with race rings of a given size.

In the construction of universal motors of fractional horse power, ranging from one thirty-second upward to one full horse power, as used in small size vacuum cleaners, the use of ball bearings for the armature shaft has practically been prohibited because of the minute diameter of the shaft required for the race rings of the size used in accordance with ordinary practice.

This difficulty has been overcome, and ancillary advantages attained, by mounting the outer race ring within a cylindric drum having a hub secured to the shaft, and by mounting the inner race ring around a bushing within the drum coplanar with the outer race ring, and secured to the base plate of the motor frame or other relatively fixed support.

An embodiment of the invention as applied to a motor for a vacuum cleaner, is illustrated in the accompanying drawing, forming part hereof, in which—

Figure 1:
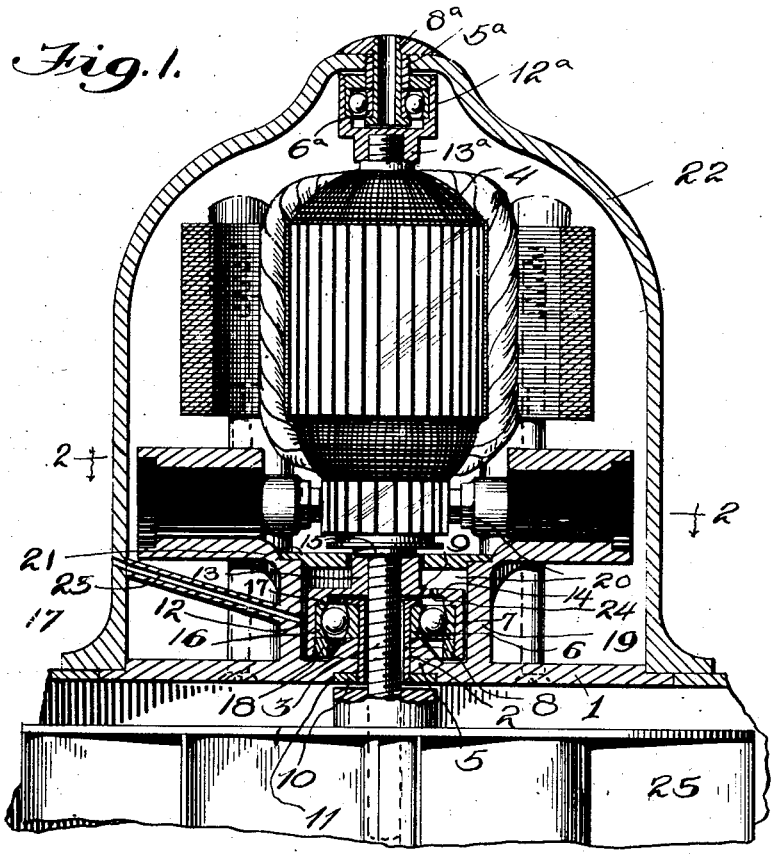
Figure 2:
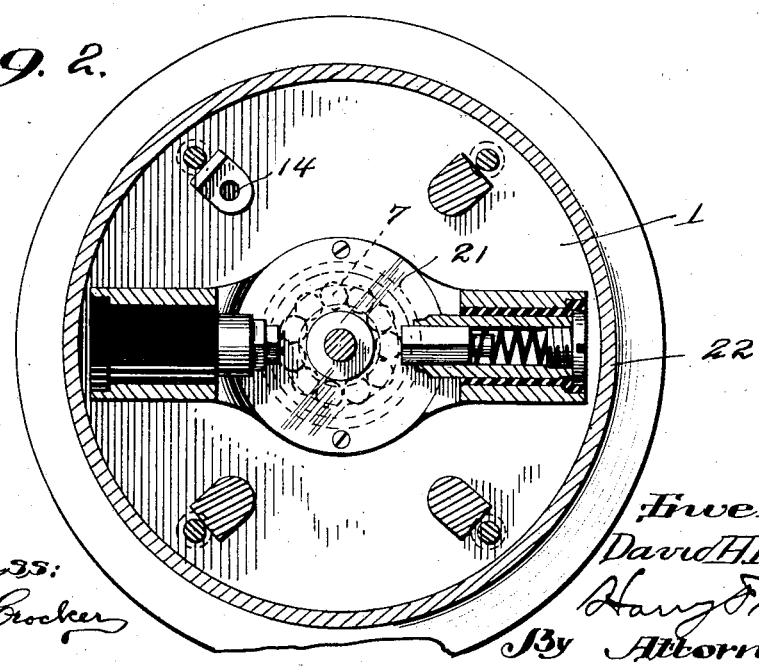

Figure 1 is a vertical section of a motor showing the bottom and top bearings made in accordance with the present invention; and Fig. 2, a plan section thereof on line 2—2, Fig. 1, with the armature and field broken away, to expose the cover plate of the bearing.

Similar numerals refer to similar parts throughout the drawings.

The base plate 1 of the motor frame is provided with the central aperture 2 for the shaft 3 of the armature 4, around which aperture is formed the tubular bearing post 5 upon which is formed or mounted the inner race ring 6 for the bearing balls 7.

The inner race ring 6 may be secured in position upon the post by the bushing 8 fitting loosely around the shaft 3. and neatly within the tubular post and the race ring, and having the external annular flange 9 on its upper end engaging the top of the race ring and the ring nut 10 on its lower end located in the corresponding recess 11 in the base plate 1, by means of which flange and nut the race ring is clamped upon the tubular post.

The cylindric drum 12 is provided with a hub 13 at one end, which may be secured to the drum by the integral head 14 which serves as a closure for the end of the drum; and the hub 13 is secured to the armature shaft 3, as by securing the hub on the shaft against the shoulder 15. formed or fixed thereon. The outer race ring 16 is mounted inside the drum and is preferably secured in position against the annular shoulder 17 therein by the ring nut 18 screwed into the rim of the open end of the drum; the parts being so proportioned and arranged that the race rings are supported in the same horizontal plane by the bearing balls 7 neatly fitting between them.

The complete bearing, thus described, may be surrounded by the cylindric supporting wall 19 rising from the face plate of the motor frame, and the bearing chamber 20 thus formed may be closed by the cover plate 21 located around the hub 13 of the bearing frame.

The upper end bearing for the armature shaft 2, illustrated in Fig. 1, shows a reverse arrangement of the parts. In this embodiment the hub 13ª is located on the lower end of the cylindric drum 12ª and the tubular supporting post 5ª for the inner race ring 6ª depends from the top of the cover 22 of the case, which post is made adjustable to accommodate a variation in the length of the shaft. Otherwise the parts of the bearing are substantially the same, as illustrated and described for the lower bearing of the shaft.

The lower bearing chamber may be filled with lubricating oil by means of the tubular duct 23 leading into the same, and the upper bearing may be filled by pouring oil directly through the bushing 8ª in the adjustable tubular post 5ª leading into the chamber, and one or more apertures 24 are provided in the head of the lower drum for preventing the suction of the fan 25 from drawing the oil from the chamber.

By the construction and arrangement illustrated and described, it is evident that a larger shaft may be used with bearing balls and race rings of a given size, and that the drum secured to the shaft for carrying the outer race ring which thus becomes the rotating ring, the important function in small sized motors of a balance wheel for the rotor, and steadies the operation of the same by maintaining its momentum.

I claim:—

1. A bearing for a rotatable shaft including a support, an inner race ring on the support, a cylindric drum secured to the shaft, an outer race ring inside the drum coplanar with the race ring on the support, and bearing balls operating between the race rings.

2. A bearing for a rotatable shaft including an adjustable support, an inner race ring on the support, a cylindric drum secured to the shaft, an outer race ring inside the drum coplanar with the race ring on the support, and bearing balls operating between the race rings.

3. A bearing for a rotatable shaft including a tubular support, an inner race ring on the support, a cylindric drum secured to the shaft, an outer race ring inside the drum coplanar with the race ring on the support, and bearing balls operating between the race rings.

4. A bearing for a rotatable shaft including a tubular support around the shaft, an inner race ring on the support, a cylindric drum secured to the shaft, an outer race ring inside the drum coplanar with the race ring on the support, and bearing balls operating between the race rings.

5. A bearing for a rotatable shaft including a tubular support, a race ring on the support, a bushing freely surrounding the shaft fitting inside the said ring and support and having a flange on one end and a ring nut on the other end for clamping the parts together, a cylindric drum having a hub on one end secured to the shaft, a race ring in the drum, a ring nut in the rim of the drum clamping the race ring therein, and bearing balls operating between the race rings.

DAVID H. FRIEND.